US008006112B2

(12) United States Patent
Munjal et al.

(10) Patent No.: US 8,006,112 B2
(45) Date of Patent: Aug. 23, 2011

(54) SYSTEM AND METHOD FOR MANAGING BLADES AFTER A POWER SUPPLY UNIT FAILURE

(75) Inventors: Ashish Munjal, Round Rock, TX (US); Arun Muthaiyan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 644 days.

(21) Appl. No.: 12/135,320

(22) Filed: Jun. 9, 2008

(65) Prior Publication Data
US 2009/0307512 A1 Dec. 10, 2009

(51) Int. Cl.
G06F 1/00 (2006.01)
G06F 1/26 (2006.01)
G06F 1/32 (2006.01)
(52) U.S. Cl. ............ 713/324; 713/300; 713/320
(58) Field of Classification Search ............ 713/300, 713/320, 324
See application file for complete search history.

(56) References Cited

U.S. PATENT DOCUMENTS

| 7,051,215 | B2 | 5/2006 | Zimmer et al. | 713/300 |
| 2003/0065958 | A1* | 4/2003 | Hansen et al. | 713/300 |
| 2005/0172158 | A1* | 8/2005 | McClendon et al. | 713/300 |
| 2007/0118771 | A1 | 5/2007 | Bolan et al. | 713/300 |
| 2007/0180280 | A1 | 8/2007 | Bolan et al. | 713/300 |
| 2007/0260897 | A1 | 11/2007 | Cochran et al. | 713/300 |

OTHER PUBLICATIONS

Dell application entitled System and Method for Automatic Throttling of Resources in an Information Handling System Chassis, (DC-14970), 28 pages, Jan. 7, 2008.

* cited by examiner

*Primary Examiner* — Thomas Lee
*Assistant Examiner* — Samantha Hoang
(74) *Attorney, Agent, or Firm* — Baker Botts L.L.P.

(57) ABSTRACT

Systems and methods for managing blades in the event of a power supply unit failure are disclosed. A method may include determining whether a reduced power capacity of the non-failed power supply units is sufficient to provide an aggregate minimum power requirement of the resources in response to a failure of a particular power supply unit. The method may also include powering down a low-priority resource and not powering down a second resource having a higher priority than the low-priority resource if the reduced power capacity of the non-failed power supply units is not sufficient to provide the aggregate minimum power requirement of the resources.

17 Claims, 3 Drawing Sheets

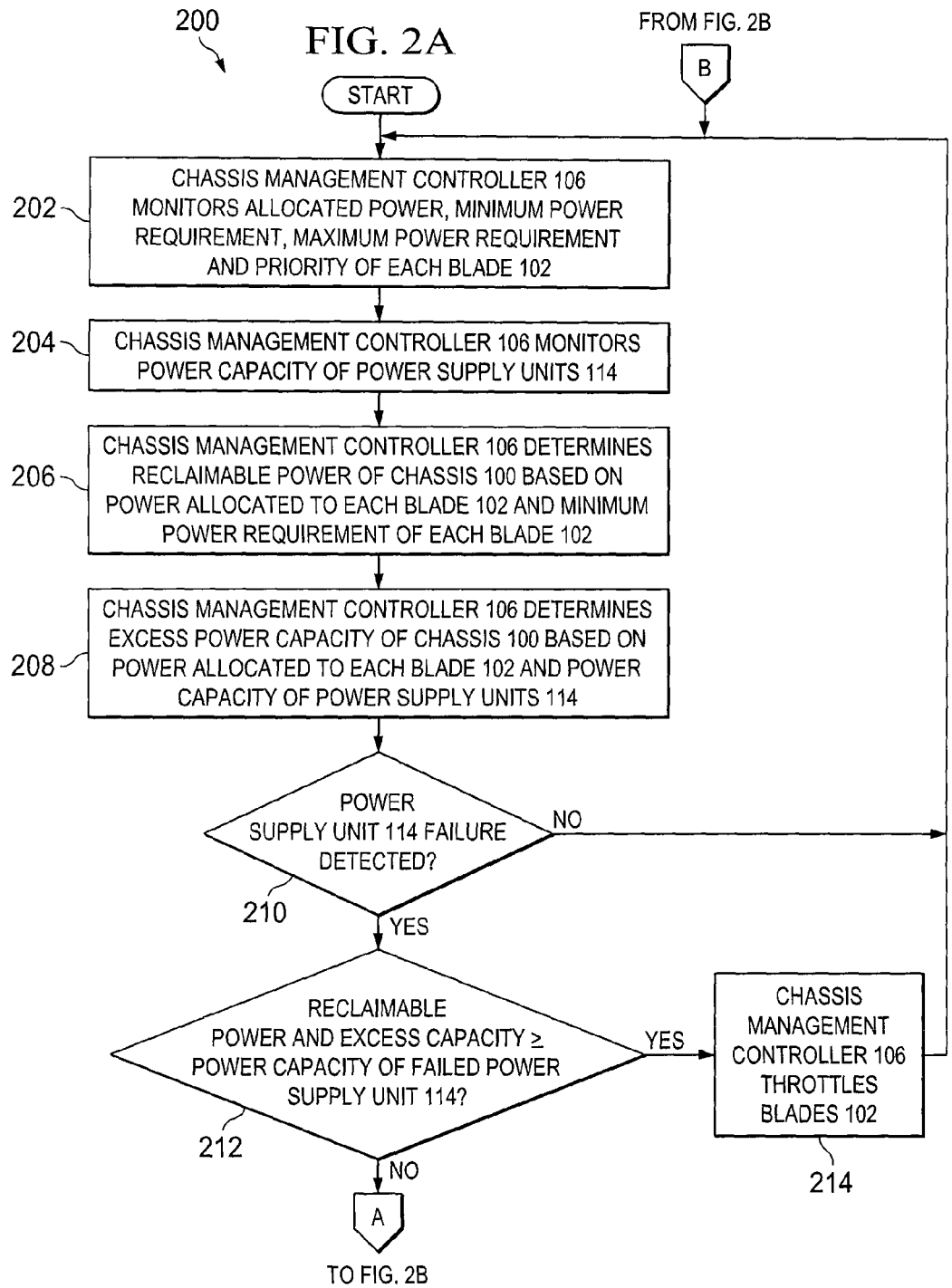

SYSTEM AND METHOD FOR MANAGING BLADES AFTER A POWER SUPPLY UNIT FAILURE

TECHNICAL FIELD

The present disclosure relates in general to blade management, and more particularly to a system and method for managing blades in the event of a power supply unit failure.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a blade server, or simply "blade." Blades are often self-contained information handling systems designed specifically to allow the placement of multiple blades in a single enclosure or aggregation of enclosures. A blade enclosure or chassis may hold multiple blades and provide services to the various blades such as power, cooling, networking, interconnects, and management. For example, the chassis may include a plurality of power supply units configured to provide power to blades mounted in the chassis.

Under traditional approaches, failure of a power supply unit in a non-redundant configuration may result in a chassis management controller reducing the power to each of its blades by throttling to a minimum operating level in an effort to allow as many blades as possible to receive power needed to operate. However, even when all blades are throttled to a minimum level, the power capacity of remaining power supply units may not be sufficient to provide the necessary power to each of the blades. In such a scenario, the chassis management controller may completely power off low-priority blades such that higher-priority blades may continue operating. A disadvantage to this approach is that high-priority blades may be throttled, at least temporarily, even though there may be sufficient power capacity within the remaining power supply units to continue to operate the high-priority blades in an unthrottled state (e.g., due to the powering off of the low-priority blades). Such throttling may lead to decreased performance.

SUMMARY

In accordance with the teachings of the present disclosure, disadvantages and problems associated with managing blades in an information handling system chassis have been substantially reduced or eliminated.

In accordance with one embodiment of the present disclosure, a method is provided for managing resources in a system including a plurality of power supply units configured to supply power to a plurality of resources. The method may include determining whether a reduced power capacity of the non-failed power supply units is sufficient to provide an aggregate minimum power requirement of the resources in response to a failure of a particular power supply unit. The method may also include powering down a low-priority resource and not powering down a second resource having a higher priority than the low-priority resource if the reduced power capacity of the non-failed power supply units is not sufficient to provide the aggregate minimum power requirement of the resources.

In accordance with another embodiment of the present disclosure, a system for managing resources in the event of a power supply unit failure may include a plurality of resources, a plurality of power supply units configured to provide electrical power to the plurality of resources, and a management controller communicatively coupled to the plurality of power supply units and the plurality of resources. The management controller may be configured to determine whether a reduced power capacity of the non-failed power supply units is sufficient to provide an aggregate minimum power requirement of the resources in response to a failure of a particular power supply unit. The management controller may also be configured to power down a low-priority resource and not power down a second resource having a higher priority than the low-priority resource if the reduced power capacity of the non-failed power supply units is not sufficient to provide the aggregate minimum power requirement of the resources.

In accordance with a further embodiment of the present disclosure, an information handling system may include a plurality of blades, each blade including a processor, a plurality of power supply units configured to provide electrical power to the plurality of blades, and a management controller communicatively coupled to the plurality of power supply units and the plurality of blades. The management controller may be operable to determine whether a reduced power capacity of the non-failed power supply units is sufficient to provide an aggregate minimum power requirement of the blades in response to a failure of a particular power supply unit. The management controller may also be configured to power down a low-priority blade; and not power down a second blade having a higher priority than the low-priority blade if the reduced power capacity of the non-failed power supply units is not sufficient to provide the aggregate minimum power requirement of the blades.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 2A and 2B illustrate a flow chart of an example method for managing blades in the event of a power supply unit failure, in accordance with the present disclosure.

DETAILED DESCRIPTION

Figure 1:
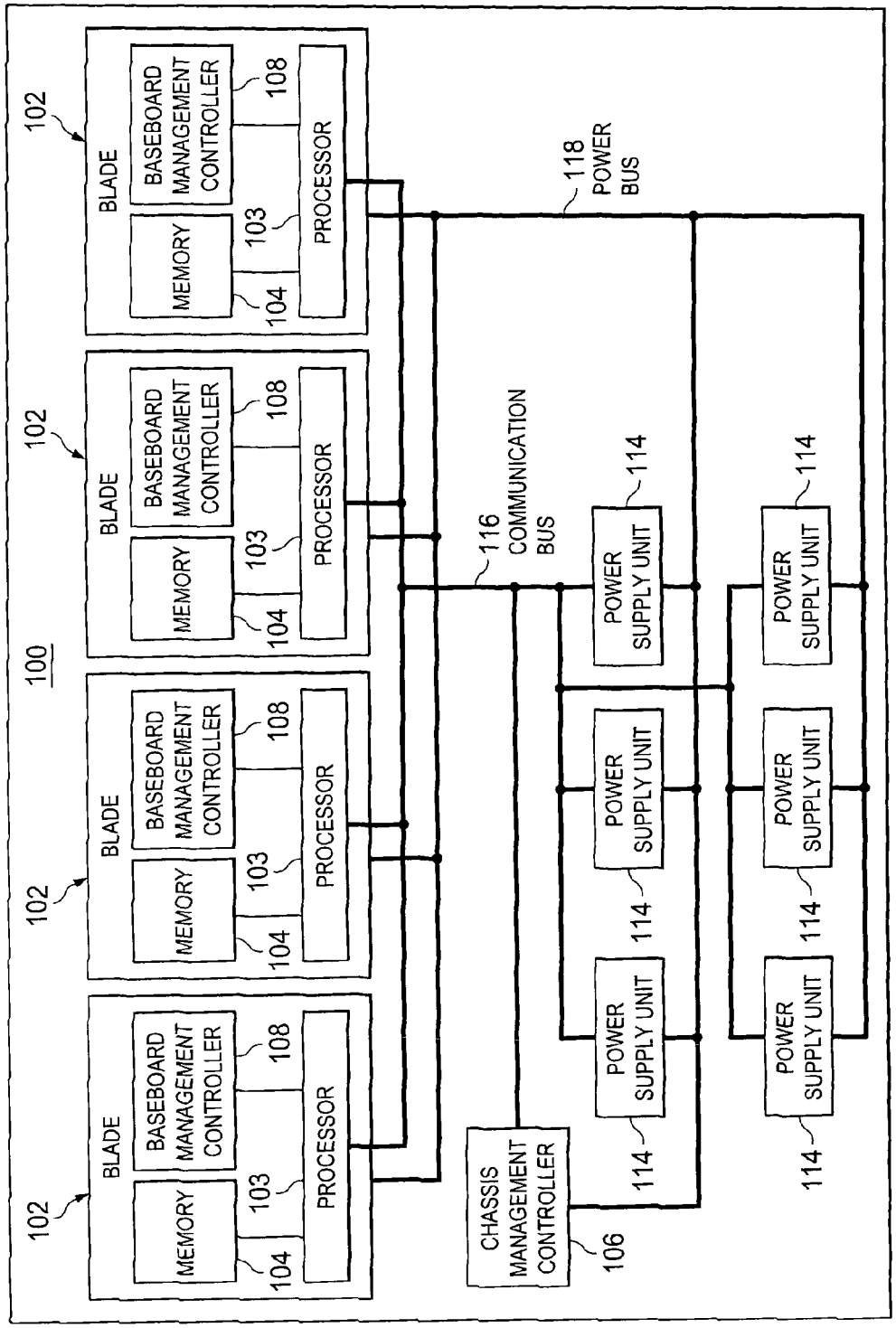
FIG. 1 illustrates a block diagram of an example information handling system chassis, in accordance with certain embodiments of the present disclosure.
Figure 2B:
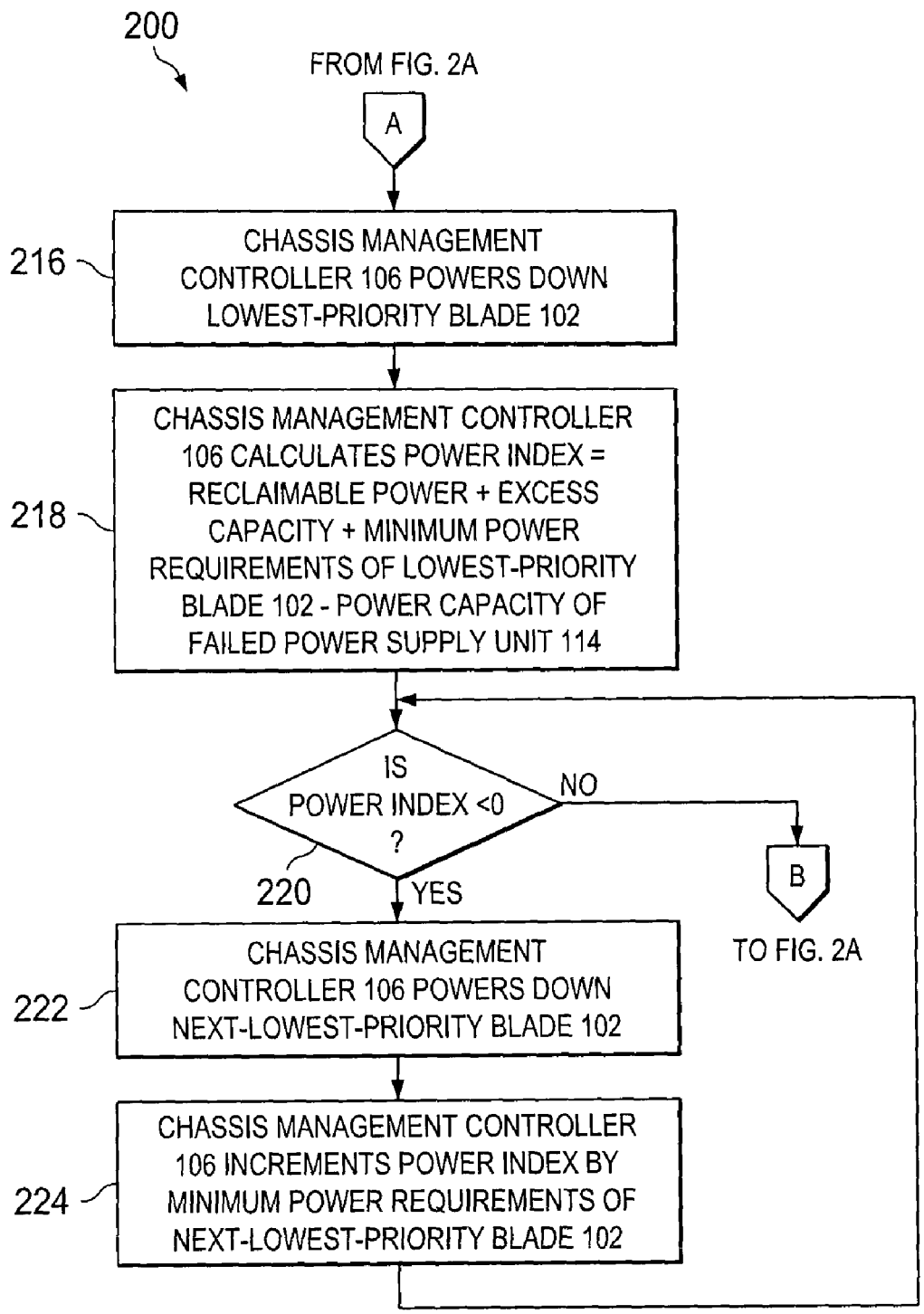

Preferred embodiments and their advantages are best understood by reference to FIGS. 1-2B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such wires, optical fibers, microwaves, radio waves, and other electromagnetic and/or optical carriers; and/or any combination of the foregoing.

FIG. 1 illustrates a block diagram of an example information handling system chassis 100 (referred to herein as "chassis 100"), in accordance with certain embodiments of the present disclosure. Chassis 100 may be an enclosure that serves as a container for various information handling components, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of server blades and/or other components (e.g., a "rack mount" system).

As depicted in FIG. 1, chassis 100 may include blades 102, one or more chassis management controllers 106, one or more fans 112, power supply units 114, a communication bus 116, and a power bus 118. As used herein, blades 102, chassis management controllers 106, fans 112, and any other components powered by power supply units 114 may be referred to herein collectively as "resources" and individually as a "resource."

Each blade 102 may comprise an information handling system. In certain embodiments, one or more blades 102 may be a server (e.g., a blade server). In such embodiments, each blade 102 may be mounted in a suitable slot and/or interface of chassis 100. As depicted in FIG. 1, each of blades 102 may include a processor 103, a memory 104, and a baseboard management controller 108. Although FIG. 1 depicts chassis 100 having four blades 102, chassis 100 may have any suitable number of blades 102.

Each processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, each processor 103 may interpret and/or execute program instructions and/or process data stored in its associated memory 104 and/or another component of chassis 100. Although FIG. 1 depicts that each blade 102 comprises a single processor 103, one or more blades 102 may include any suitable number of processors 103.

Each memory 104 may be communicatively coupled to an associated processor 103 and may comprise any system, device, or apparatus operable to retain program instructions or data for a period of time. Each memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated blade 102 and/or chassis 100 is turned off. Although FIG. 1 depicts memory 104 as a component integral to blade 102, one or more memories 104 may reside external to blade 102.

Each baseboard management controller 108 may be any system, device, and/or apparatus operable to control and/or manage its associated blade 102 and/or individual components of its associated blade. In certain embodiments, baseboard management controller 108 may be configured to provide an out-of-band management interface between its associated blade 102 and a remote system and that allows monitoring and management of the associated blade 102 from the remote system. In certain embodiments, baseboard management controller 108 may include a Dell Remote Access Controller (DRAC). Baseboard management controller 108 may allow a user remote to chassis 100 to manage an associated blade 102 and/or and the components thereof as if the user were sitting at a local console. In certain embodiments, baseboard management controller 108 may determine and/or receive a power allocation request or requirement for its associated blade 102 and communication such request or requirement to chassis management controller 106.

Chassis management controller 106 may be communicatively coupled to components of chassis 100, may be electrically coupled to power supply units 114, and/or may include any system, device or apparatus operable to monitor the power requirements of and control the operation of components of chassis 100. Chassis management controller 106 may include any hardware, firmware, and/or software for determining the productivity of individual power supply units 114, as well as the productivity of various combinations of power supply units 114 (e.g., in a load sharing configuration). For example, in some embodiments, chassis management controller 106 may be operable to determine the power requirements of the various components of chassis 100. In the same or alternative embodiments, chassis management controller 106 may manage power supply units 114 such that power supply units 114 provide the power required by the various components of chassis 100 (e.g., bringing appropriate power supply units 114 online or offline, and/or controlling the power delivered by each of the power supply units 114). In some embodiments, chassis management controller 106 may receive requests for power allocation from one or more baseboard management controllers 108.

Fans 112 may include one or more mechanical or electromechanical fan used for cooling purposes. In certain embodiments, fans 112 may draw cool air into chassis 100 from the outside, expel warm air from inside chassis 100, and/or move air across a heatsink to cool one or more particular components of chassis 100.

Each of power supply units 114 may include any device, system, or apparatus operable to supply power or electrical energy to one or more components of chassis 100. For example, one or more of power supply units 114 may include any system, device, and/or apparatus operable to supply direct current (DC) electrical power to one or more components of chassis 100. In some embodiments, DC power sources may include a battery and/or an AC/DC adapter that may convert 120- or 240-volt (or any other suitable voltage) alternating current supplied by a utility company to a regulated lower voltage DC power source. In addition, an AC/DC adapter may also charge a battery while supplying power to chassis 100.

In addition or alternatively, one or more of power supply units 114 may include any system, device, and/or apparatus operable to supply AC electrical power directly to one or more components of chassis 100. In some embodiments, the delivered AC power may subsequently be converted into a DC power source (e.g., using an AC/DC converter). In some embodiments, one or more of power supply units 114 may include uninterruptible power sources and/or switch mode power sources internal to/or externally coupled to chassis 100. In some embodiments, power supply units 114 may be assembled in a non-redundant configuration within chassis 100.

Each of power supply units 114 may individually be referred to herein as "power supply unit 114." In addition, any plurality of power supply units 114 may be collectively referred to herein as "power supply units 114."

Communication bus 116 may include any device, system or apparatus configured to transmit data and/or signals between the various components of chassis 100. For example, communication bus 116 may allow chassis management controller 106 to communication with blades 102, fans 112, and/or power supply units 114. Communication bus 116 may include any suitable topology (e.g., parallel, bit-serial, multidrop, daisy chain, coupled via switched hubs, etc.).

Power bus 118 may include any device, system or apparatus configured to deliver electrical current from power supply units 114 to other components of chassis 100 (e.g., blades 102, chassis management controller 106, fans 112).

In operation, chassis management controller 106 may monitor and/or compute the power allocated to resources of chassis 100, the minimum and/or maximum power requirements of blades 102, and/or priorities of blades 102. In addition, chassis management controller 106 may monitor the power capacity of power supply units 114. In the event of a power supply unit 114 failure, chassis management controller 106 may be able to determine (based at least on the monitored parameters set forth above) whether remaining non-failed power supply units 114 are able to provide sufficient power capacity to all blades 102 in their minimum-power states. As described in greater detail below, if sufficient power capacity is not present, chassis management controller 106 may power down (e.g., turn off, enter a sleep mode, enter a low power mode, etc.) lower-priority blades 102, allowing higher-priority blades 102 to continue operating at their allocated power levels. If sufficient power capacity is present, chassis management controller 106 may throttle blades 102 allowing them to operate at their minimum power levels (or other reduced power level).

FIGS. 2A and 2B illustrate a flow chart of an example method 200 for managing blades in the event of a power supply unit 114 failure, in accordance with certain embodiments of the present disclosure. According to one embodiment, method 200 preferably begins at step 202. As noted above, teachings of the present disclosure may be implemented in a variety of configurations of chassis 100. As such, the preferred initialization point for method 200 and the order of the steps 202-224 comprising method 200 may depend on the implementation chosen.

At step 202, chassis management controller 106 may monitor the amount of power allocated to blades 102, the minimum and maximum power requirements of each blade 102, and the priority of each blade 102. For example, each baseboard management controller 108 of each blade 102 may communicate such monitored information to chassis management controller 106 via communication bus 116. Chassis management controller 106 may also store such monitored information in a memory and/or other computer-readable medium.

At step 204, chassis management controller 106 may monitor the power capacity of power supply units 114. For example, each power supply unit 114 may communicate power capacity information to chassis management controller 106 via communication bus 116. In addition, chassis management controller 106 may store monitored power capacity information in a memory and/or other computer-readable medium.

At step 206, chassis management controller 106 may determine the reclaimable power available in chassis 100 based at least on the power allocated to each blade 102 and the minimum power requirement of each blade 102. The "reclaimable power" may broadly be defined as the difference between the power allocated to all resources in chassis 100 and the minimum amount of power required to power all resources in chassis 100. Thus, reclaimable power may approximately equal the aggregate power allocated to blades 102 less the aggregate minimum power requirement of blades 102.

At step 208, chassis management controller 106 may determine the excess power capacity of chassis 100 based at least on the power allocated to each blade 102 and the power capacity of power supply units 114. The "excess power capacity" may broadly be defined as the difference between the aggregate power capacity of power supply units 114 and the aggregate power allocated to all resources in chassis 100.

At step 210, chassis management controller 106 may monitor for a failure of any of power supply units 114. A power supply unit 114 failure may occur due to numerous reasons, including, without limitation, malfunction of a power supply unit 114, loss of a power source (e.g., a power outage) of a power supply unit 114, and removal of a power supply unit 114. If a power supply unit 114 failure is not detected, method 200 may return to step 202. Otherwise, if a power supply unit 114 failure is detected, method 200 may proceed to step 212.

At step 212, chassis management controller 106 may, in response to the detection of a power supply unit 114 failure, determine whether the sum of the reclaimable power of chassis 100 and the excess capacity of chassis 100 is greater than or equal to the individual power capacity of the failed power supply unit 114.

If the reclaimable power plus excess capacity of chassis 100 is greater than or equal to the power capacity of the failed power supply unit 114, the power capacity of the remaining power supply units 114 may be sufficient to provide adequate power to all blades 102 in their minimum-power states, and method 200 may proceed to step 214. Otherwise, if the reclaimable power plus excess capacity of chassis 100 is less than the power capacity of the failed power supply unit 114, the power capacity of the remaining power supply units 114 may be not sufficient to provide adequate power to all blades 102 in their minimum-power states, and method 200 may proceed to step 216.

At step 214, in response to determining that the reclaimable power plus excess capacity of chassis 100 is greater than or equal to the power capacity of the failed power supply unit 114, chassis management controller 106 may throttle blades 102 to their minimum-power states (or other reduced power state). For example, chassis management controller 106 may communicate, via communication bus 116, a command to allocate power to each blade 102 in accordance with the minimum power requirement of each blade 102. After completion of step 214, method 200 may proceed to step 202.

At step 216, in response to determining that the reclaimable power plus excess capacity of chassis 100 is less than the power capacity of the failed power supply unit 114, chassis management controller 106 may power down the lowest-priority blade 102. For example, chassis management controller 106 may analyze the priority of each blade 102, and power down the blade 102 with the lowest priority (e.g., by communicating a command via communication bus 116 to power down the lowest-priority blade).

In accordance with the present disclosure, any suitable approach may be used to set and/or establish the priority of the various blades 102. For example, a user of chassis 100 (e.g., a network administrator and/or information technology technician) may set the priority of one or more blades 102. In other embodiments, management controller 106 may determine the priority of one or more blades 102 based on one or more factors including, for example, the particular applications executing on each blade 102, the processing capacity of each blade 102, or the memory capacity of each blade 102.

At step 218, chassis management controller 106 may calculate a power index, wherein the power index is equal to the previously-determined reclaimable power of chassis 100, plus the previously-determined excess capacity of chassis 100, plus the minimum power requirement of the lowest priority blade 102 powered down at step 216 minus the power capacity of the failed power supply unit 114.

At step 220, chassis management controller may determine whether the calculated power index is less than zero. If the power index is greater than or equal to zero, the power capacity of the remaining power supply units 114 may be sufficient to provide power to the remaining powered-on blades 102, and method 200 may proceed to step 202. Otherwise, if the power index is greater than or equal to zero, the power capacity of the remaining power supply units 114 may not be sufficient to provide power to the remaining powered-on blades in accordance with their minimum power levels (or other reduced power states), and method 200 may proceed to step 222.

At step 222, in response to determining the power index is less than zero, chassis management controller 106 may power down the next-lowest-priority blade 102. For example, chassis management controller 106 may analyze the priority of each blade 102, and power down the blade 102 with the lowest priority (e.g., by communicating a command via communication bus 116 to power down the next-lowest-priority blade).

At step 224, chassis management controller 106 may update the power index by adding to the previously-calculated value of the power index the minimum power requirement of the next-lowest-priority blade 102 powered down at step 222. After completion of step 224, method 200 may proceed again to step 220.

Although FIGS. 2A and 2B disclose a particular number of steps to be taken with respect to method 200, it is understood that method 200 may be executed with greater or fewer steps than those depicted in FIGS. 2A and 2B. In addition, although FIGS. 2A and 2B discloses a certain order of steps to be taken with respect to method 200, the steps comprising method 200 may be completed in any suitable order. For example, in certain embodiments, step 202 may executed before, after, or substantially contemporaneous with step 204. In addition, in certain embodiments, step 206 may executed before, after, or substantially contemporaneous with step 208. Method 200 may be implemented using system 100 or any other system operable to implement method 200. In certain embodiments, method 200 may be implemented partially or fully in software and/or firmware embodied in tangible computer-readable media.

Although the foregoing discussion has been directed towards a blade and power supply unit arrangement in a single chassis 100 for the purposes of clarity, approaches identical or similar to the systems and methods described above may be applied to a multiple-chassis arrangement.

Using the methods and systems disclosed herein, problems associated conventional approaches to managing blades in response to a power supply unit failure have been reduced or eliminated. For example, the methods and systems disclosed may allow for a determination of whether non-failed power supply units are able to provide power to blades in a chassis, and may avoid the throttling of high-priority blades in situations in which lower-priority blades must be powered down. Such approaches may allow for decreased performance penalties in the event of a power supply unit failure.

Although the present disclosure has been described in detail, it should be understood that various changes, substitutions, and alterations can be made hereto without departing from the spirit and the scope of the invention as defined by the appended claims.

What is claimed is:

1. A method for managing resources in a system including a plurality of power supply units configured to supply power to a plurality of resources, the method comprising:

in response to a failure of a particular power supply unit, determining whether a reduced power capacity of the non-failed power supply units is sufficient to provide an aggregate minimum power requirement of the resources, wherein determining whether the reduced power capacity is sufficient to provide the aggregate minimum power requirement comprises:
  determining a reclaimable power for the resources based at least on the power allocated and the aggregate minimum power requirement;
  determining an excess power capacity for the plurality of power supply units; and
  determining whether the sum of the reclaimable power and the excess power capacity is less than a power capacity of the particular power supply unit; and
if the reduced power capacity of the non-failed power supply units is not sufficient to provide the aggregate minimum power requirement of the resources:
  powering down a low-priority resource; and
  not powering down a second resource having a higher priority than the low-priority resource.

2. A method according to claim 1, further comprising maintaining power to the second resource in an amount substantially equivalent to the power allocated to the second resource prior to the failure of the failed power supply unit.

3. A method according to claim 1, wherein the plurality of resources comprise a plurality of blades.

4. A method according to claim 1, wherein the reclaimable power is approximately equal to the difference between the power allocated to the plurality of resources and the aggregate minimum power requirement.

5. A method according to claim 1, wherein the excess power capacity is approximately equal to the difference between an aggregate power capacity of the plurality of power supply units and the power allocated to the plurality of resources.

6. A method according to claim 1, further comprising powering down a second low-priority resource if the reduced power capacity is not sufficient to provide the aggregate minimum power requirement to all resources other than the low-priority resource.

7. A system for managing resources in the event of a power supply unit failure, comprising:
   a plurality of resources;
   a plurality of power supply units configured to provide electrical power to the plurality of resources; and
   a management controller communicatively coupled to the plurality of power supply units and the plurality of resources and configured to:
     in response to a failure of a particular power supply unit, determine whether a reduced power capacity of the non-failed power supply units is sufficient to provide an aggregate minimum power requirement of the resources, the management controller further configured to determine whether the reduced power capacity is sufficient to provide the aggregate minimum power requirement by:
       determining a reclaimable power for the resources based at least on the power allocated and the aggregate minimum power requirement;
       determining an excess power capacity for the plurality of power supply units; and
       determining whether the sum of the reclaimable power and the excess power capacity is less than a power capacity of the particular power supply unit power capacity; and
     if the reduced power capacity of the non-failed power supply units is not sufficient to provide the aggregate minimum power requirement of the resources:
       power down a low-priority resource; and
       not power down a second resource having a higher priority than the low-priority resource.

8. A system according to claim 7, wherein the management controller is further configured to maintain power to the second resource in an amount substantially equivalent to the power allocated to the second resource prior to the failure of the failed power supply unit.

9. A system according to claim 7, wherein the plurality of resources comprise a plurality of blades.

10. A system according to claim 7, wherein the reclaimable power is approximately equal to the difference between the power allocated to the plurality of resources and the aggregate minimum power requirement.

11. A system according to claim 7, wherein the excess power capacity is approximately equal to the difference between an aggregate power capacity of the plurality of power supply units and the power allocated to the plurality of resources.

12. A system according to claim 7, the management controller further configured to power down a second low-priority resource if the reduced power capacity is not sufficient to provide the aggregate minimum power requirement to all resources other than the low-priority resource.

13. An information handling system comprising:
   a plurality of blades, each blade including a processor;
   a plurality of power supply units configured to provide electrical power to the plurality of blades; and
   a management controller communicatively coupled to the plurality of power supply units and the plurality of blades and configured to:
     in response to a failure of a particular power supply unit, determine whether a reduced power capacity of the non-failed power supply units is sufficient to provide an aggregate minimum power requirement of the blades; the management controller further configured to determine whether the reduced power capacity is sufficient to provide the aggregate minimum power requirement by:
       determining a reclaimable power for the blades based at least on the power allocated and the aggregate minimum power requirement;
       determining an excess power capacity for the plurality of power supply units; and
       determining whether the sum of the reclaimable power and the excess power capacity is less than a power capacity of the particular power supply unit; and
     if the reduced power capacity of the non-failed power supply units is not sufficient to provide the aggregate minimum power requirement of the blades:
       power down a low-priority blade; and
       not power down a second blade having a higher priority than the low-priority blade.

14. An information handling system according to claim 13, wherein the management controller is further configured to maintain power to the second blade in an amount substantially equivalent to the power allocated to the second blade prior to the failure of the failed power supply unit.

15. An information handling system according to claim 13, wherein the reclaimable power is approximately equal to the difference between the power allocated to the plurality of blades and the aggregate minimum power requirement.

16. An information handling system according to claim 13, wherein the excess power capacity is approximately equal to the difference between an aggregate power capacity of the plurality of power supply units and the power allocated to the plurality of blades.

17. An information handling system according to claim 13, the management controller further configured to power down a second low-priority blade if the reduced power capacity is not sufficient to provide the aggregate minimum power requirement to all blades other than the low-priority blade.

* * * * *